Patented Mar. 12, 1940

2,193,553

UNITED STATES PATENT OFFICE 2,193,553

INSOLUBLE AZO DYE CONTAINING AROMATIC NUCLEUS OF THE DIPHENYL SERIES

Miles Augustinus Dahlen and Newell Meade Bigelow, Wilmington, and Frithjof Zwilgmeyer, Arden, Del., assignors to E. I. du Pont de Nemours & Company, Wilmington, Del., a corporation of Delaware No Drawing. Application February 3, 1937, Serial No. 123,860

13 Claims. (Cl. 260—193)

This invention relates to new compounds, to new compositions of matter, to processes of dyeing and to processes of making the new compounds. More particularly the invention relates to new compositions of matter including azo dyes, and to processes of employing them, particularly in printing processes. The invention will be described with reference to particular examples which are illustrative but not limitative thereof.

The azo dyes are a well-defined group containing the chromophor —N=N—. The chromogen of azo dyestuffs comprises two aryl radicals with the chromophor between them. The mono azo dyes are generally prepared by joining two components of which the first, an amine, is called the azo component, and the second, usually a phenol, an amine, or an active methylene compound, is called the coupling component. In coupling the components, the azo component is diazotized, and is reacted with the second component, usually in solution.

The azo dyes of the prior art are dyed by different processes depending on the nature and properties of the particular dyes. When the completed dyestuff is substantive to the material to be dyed the dye is disposed in a suitable liquid medium and the material is dipped therein. When the coupling component or the diazotized azo component of the dye is substantive to the material to be dyed, the substantive component can be affixed to the material and the other component can be coupled therewith to complete the dye on the material. This invention relates to compounds and to processes of making the compounds which are applied to the material and formed by still another process, according to which an azo component is diazotized and coupled to a compound with which it forms a new compound stable in alkaline or neutral medium, and is mixed with the coupling component of the dye and with the other ingredients of a basic or neutral printing paste, or solution. The material to be dyed is impregnated with the paste, or with the solution, by printing or in any other satisfactory manner and the dye is formed on the material by reaction with an acid, whereby it is freed and enabled to react with the coupling component.

In copending application Serial No. 55,410 filed December 20, 1935, Patent No. 2,115,412 dated April 26, 1938 of which this application is a continuation-in-part compounds were disclosed which are formed by coupling a diazotized arylamine represented by the formula

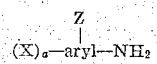

in which Z is one of a group consisting of hydrogen, amino and an n-auxochrome hereinafter to be defined, X is one of a group consisting of hydrogen and n-auxochrome, and $a$ is an integer at least two less than the number of carbon atoms in aryl, with a compound represented by the formula

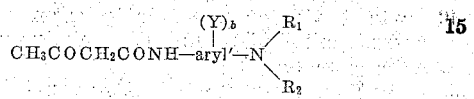

in which Y is one of a group consisting of hydrogen and an n-auxochrome, $b$ is an integer at least 2 less than the number of carbon atoms in aryl', $R_1$ is one of a group consisting of hydrogen, alkyl, aryl, and aralkyl, $R_2$ is one of a group consisting of alkyl, aryl, aralkyl, and acyl and $R_1$ and $R_2$ may be nuclear elements of one heterocyclic radical. The present invention refers to compounds of this class which have a coupling component represented by the same general formula in which aryl' is the residue of a diphenyl compound.

It is an object of the invention to prepare new compounds and to prepare new compositions of matter suitable for the dyeing of textile fibers and other dye-susceptible materials. Another object of the invention is to prepare mixtures of stable, water-soluble diazoimino compounds and diazotized arylamines capable of coupling with diazo salts. Another object of the invention is to prepare the new compounds and new compositions of matter of this invention by methods which are economically and technically satisfactory. Another object of the invention is to produce materials dyed in satisfactory shades of yellow. Other objects of the invention will be in part apparent and in part more fully hereinafter set forth.

The major object of the invention is accomplished generally by dyeing dye-susceptible materials with compounds formed by coupling a diazotized arylamine which was hereinbefore described with a coupling component represented by the formula $$\text{Alkyl}-\underset{\underset{O}{\|}}{C}-\underset{\underset{H}{|}}{\overset{H}{\underset{|}{C}}}-\underset{\underset{O}{\|}}{C}-\underset{\underset{H}{|}}{N}-\text{aryl}'-\underset{\underset{H}{|}}{N}-\underset{\underset{O}{\|}}{C}-\text{alkyl} \quad (Y)_b$$

in which aryl' is a residue of a diphenyl compound, $b$ is an integer at least four less than the number of carbon atoms in aryl' and Y is representative of the groups and values already given in the above general formula. Another object of the invention is attained by stabilizing a diazotized arylamine of the said formula against reaction in non-acid medium, and incorporating it in a non-acid medium with an aceto-acetyl-arylamine of the said formula. Another object of the invention is attained by impregnating a dye-susceptible material with one of the said new compositions of matter and exposing it to the action of acid fumes. Another object of the invention is accomplished by preparing the new compounds and compositions of matter by technically and economically satisfactory methods, the details of certain of which are more fully hereinafter set forth.

In the practice of the invention the azo component is stabilized against reaction in alkaline or neutral medium with a coupling component either by forming the nitrosamine or a diazo-imino compound thereof, of which both methods will be understood by persons skilled in the art. The stabilized azo component will then be mixed in the form of dry powder, a paste, or a solution with the alkaline or neutral mass containing the coupling component. The details of the processes of practicing the invention will differ somewhat according to the state of the ingredients but the general method is to impregnate the colorable material with the so-formed mixture, and to act upon it with enough acid to regenerate the azo component and permit it to act upon the coupling component.

In the form of the invention which involves the dyeing of a cloth by the so-called process of printing, the azo component, diazotized and stabilized as hereinabove described, is mixed in a basic paste with the coupling component, the paste is applied to an etched or "printing" roller which impregnates the fabric by contact, the fabric is placed in a closed container, and is subjected for a few seconds, at elevated temperature and usually in the presence of water vapor, to the action of the fumes of an acid which neutralizes the basicity of the paste, breaks up the stabilized complex, and frees the azo component for reaction with the coupling component.

The aryl components of the new dyestuffs may advantageously include as nuclear substituents one or more of the n-auxochromes, which in the diphenyl compound may be substituted in either or both benzene rings. The n-auxochromes we define to consist of the group alkyl, alkoxy, aryl, aralkyl, aralkoxy, aryloxy, hydro-aryl, hydro-aryloxy, nitro, halogen, and trifluoromethyl. Generally speaking, satisfactory results are obtained by the use of azo components having from 0 to 3 of such substituents and the use of larger number of n-auxochrome substituents does not appear to produce results advantageous enough to warrant the extra expense of incorporating them. It is also possible to incorporate in the aryl nuclei water-solubilizing substituents such as the carboxylic and sulfonic acid groups, but such incorporation tends to water-solubilize colors and make them useless for ordinary dyeing purposes. Consequently, such substituents will be used only in those comparatively rare instances when a water-soluble color is desired.

Illustrative of the general utility as azo components of primary arylamines are the following:

Ortho-chloro-aniline
2:5-dichloro-aniline
4-chloro-2-amino-phenetol
Ortho-anisidine
4-chloro-2:5-dimethyl-aniline
4-benzoyl-amino-2:5-dimethoxy-aniline
5-nitro-2-amino-anisole
1-methoxy-2-naphthylamine
4-chloro-2-amino-diphenyl-ether
Meta-amino-benzo-trifluoride
Ortho-amino-azo-toluene
4:4'-diamino-diphenylamine
3-amino-carbazole It will be observed that aryldiamines may be used with success. The diazo components may be amines and diamines of the various aromatic series. As examples thereof, amines and diamines of the benzene, naphthalene, diphenyl, anthracene, carbazole, azo-benzene, azoxy-benzene, diphenylamine, diphenyl-ether, phenanthrene, and pyrene series are cited.

Any of the usual stabilizing agents may be used in the preparation of water-soluble diazoimino compounds. The following are exemplary, but not limitative, of the class:

Sarcosin
1-methyl-amino-ethane-2-sulfonic-acid
Proline
Nipecotinic-acid
Benzylene-imine-para-sulfonic-acid
1-naphthylamine-2:4:8-trisulfonic-acid
2-ethyl-amino-4-sulfo-benzoic-acid Examples of other derivatives of diazotized arylamines which are inactive toward coupling components under alkaline conditions, but which revert to the diazo form when reacted upon by acids, are for instance the so-called azo-sulfonates, compounds having the formula $$\text{Aryl}-N=N-SO_3-Na$$

The following examples, in which parts are by weight, are designed to illustrate but not to limit the various features of the invention:

*Example I*

A printing paste was prepared according to the following formula:

2.5 parts of acetoacet-acetyl-tolidine prepared from acetyl-tolidine by aceto-acetylation in xylene at about 150° C. in the usual manner, of the following probable formula $$CH_3-\underset{\underset{O}{\|}}{C}-CH_2-\underset{\underset{O}{\|}}{C}-\underset{\underset{H}{|}}{N}-\underset{CH_3}{\underset{|}{\bigcirc}}-\underset{CH_3}{\underset{|}{\bigcirc}}-\underset{\underset{H}{|}}{N}-\underset{\underset{O}{\|}}{C}-CH_3$$

a white product having a melting point of 221° C.

2.5 parts of the diazoimino compound of the formula $$\underset{Cl}{\underset{|}{\bigcirc}}^{OCH_3}-N=N-N\underset{CH-CH_2}{\overset{CH_2-CH_2}{<}}\underset{|}{\overset{}{>}}CH_2$$
$$\qquad\qquad\qquad\qquad\qquad COONa$$

obtained by the action of diazotized 4-chloro-2- amino-anisole on alpha-piperidine-carboxylic-acid.

27.0 parts water
3.0 parts sodium hydroxide solution of 35% strength.
65.0 parts of starch-tragacanth thickener of the following composition:

100.0 parts
  80 parts wheat starch
  360 parts gum tragacanth—6% solution
  560 parts water 1000 parts Cotton piece goods were printed from an engraved roll with the above paste, the prints dried in the air, and then subjected to the action of live steam containing the vapors of acetic acid.

Color development took place and the printed goods were rinsed with water, boiled for 5 minutes in an 0.5% soap solution, again rinsed, and dried. A bright yellow dyeing appeared. The new color had the probable formula:

[Structural formula]

*Example II*

2.5 parts of acetoacet-acetyl-tolidine as mentioned in Example I. 2.5 parts of the diazoimino compound of the formula

[Structural formula]

obtained by the action of diazotized 4-chloro-2-amino-toluene on methyl-glucamine, was developed in a similar manner as in Example I to a bright greenish yellow of the probable formula

[Structural formula]

*Example III*

2.6 parts of acetoacet-acetyl-tolidine as mentioned in Example I. 2.4 parts of the tetrazoimino compound of the formula

[Structural formula]

obtained by the action of tetrazotized tolidine on methyl-glucamine was developed in a similar manner as in Example I to a bright orange of the probable formula

[Structural formula]

*Example IV*

2.2 parts of acetoacet-acetyl-tolidine as mentioned in Example I. 2.8 parts of the diazoimino compound of the formula

[Structural formula]

obtained by the action of the diazo of 4-amino-4'-dimethyl-amino-azo-benzene on methyl glucamine was developed in a similar manner as in Example I to a yellowish brown of the probable formula

[Structural formula]

*Example V*

2.4 parts of acetoacet-acetyl-benzidine prepared from acetyl-benzidine by aceto-acetylation, of the probable formula $CH_3COCH_2CONH-\langle\rangle-\langle\rangle-NHOCCH_3$ A white compound of M. P. 240° C.

2.6 parts of the diazoimino compound of the formula

[Structural formula]

obtained by the action of diazotized 4-chloro-2-amino-anisole on methyl-glucamine was developed in a similar manner as in Example I to a bright yellow of the probable formula

[Structural formula]

*Example VI*

2.5 parts of acetoacet-acetyl-benzidine as mentioned in Example V. 2.5 parts of the diazoimino compound as mentioned in Example II was developed in a similar manner as in Example I to a bright greenish yellow of the probable formula

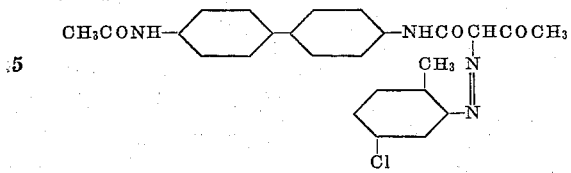

Example VII 2.6 parts of acetoacet-acetyl-benzidine as mentioned in Example V. 2.4 parts of the diazoimino compound as mentioned in Example III was developed in a similar manner as in Example I to a bright orange of the probable formula

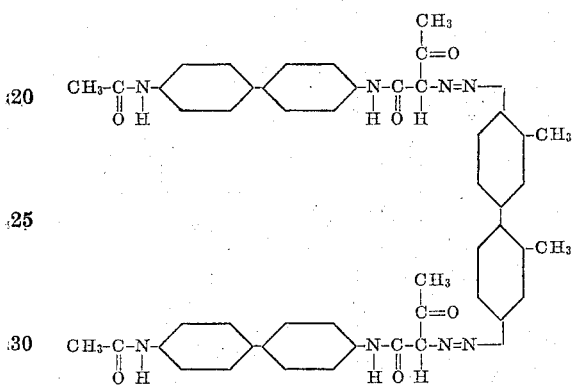

Similar dyes may be prepared from acetoacet-acetyl-dichlor-benzidine or acetoacet-acetyl-dianisidine and diazoimino compounds of ice color bases.

The following groups are mentioned as examples of the group

which may be used in a similar manner instead of acetyl-amino groups which are shown in the above examples; carbon-methoxy-amino (–NH–COOCH₃), benzoyl-amino (–NH–COC₆H₅), benzyl-amino (–NH–CH₂–C₆H₅), furoyl-amino

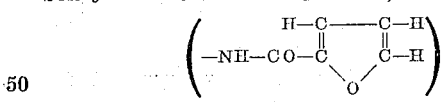

the residue of piperidine

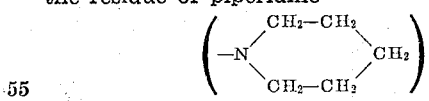

and the residue of morpholine

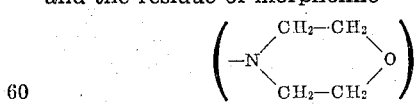

Tetrazotized arylene-diamines may be coupled to two equivalents of coupling components to produce the compound having the formula

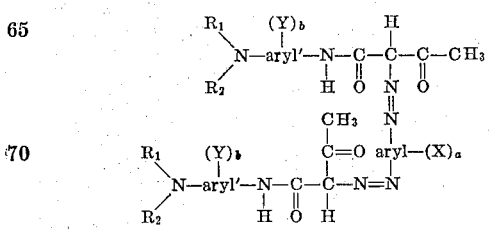

in which the groups and values in the formula are the same as those hereinbefore set forth.

In the foregoing examples, the colors have been produced by the use of the diazo-components in the form of their water-soluble diazoimino derivatives, but they may also be produced by the use of the diazo salts prepared from the diazo components, by the use of the nitrosamines (anti-diazotates), and by the other methods well-known in the art.

The invention is applicable to the dyeing of cotton, regenerated cellulose, cellulose esters and ethers, and, with somewhat less satisfactory results, to the dyeing of wool, silk, and leather.

The examples illustrate the colors as self-shades, but they may be used in mixtures, to produce a wide range of shades. The colors also may be applied in combination with reds and blues to yield a wide range of browns and blacks.

As many apparently widely different embodiments of this invention may be made without departing from the spirit and scope thereof, it is to be understood that we do not limit ourselves to the specific embodiments thereof except as defined in the appended claims.

We claim:

1. An azo compound comprising the radical of a diazotized arylamine coupled to the radical of an acylated aceto-acetyl-diphenyl compound in which the acyl group is devoid of groups which couple with diazo salts.

2. An azo compound comprising the radical of a diazotized aryl amine which is devoid of water-solubilizing groups coupled with the radical of an aryl amide of aceto-acetic acid represented by the formula

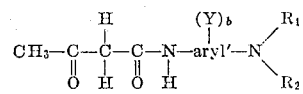

in which aryl' is a radical of the diphenyl series, Y is one of a group consisting of hydrogen and the n-auxochromes, b is an integer at least four less than the number of carbon atoms in aryl', —NR₁R₂ is one of a group consisting of the radical of piperidine, the radical of morpholine and amine radicals in which R₁ is one of the group consisting of hydrogen, alkyl, aryl, and aralkyl and R₂ is one of a group consisting of alkyl, aryl, aralkyl and acyl which is devoid of groups capable of coupling with diazo salts.

3. An azo compound comprising the radical of a diazotized arylamine coupled with an arylamide of acetoacetic acid represented by the formula

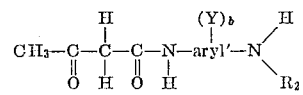

in which aryl' is a radical of the diphenyl series, Y is one of a group consisting of hydrogen and the n-auxochromes, b is an integer at least four less than the number of carbons in aryl', and R₂ is alkyl, aryl, aralkyl and acyl which is devoid of groups capable of coupling with diazo salts.

4. A compound represented by the formula

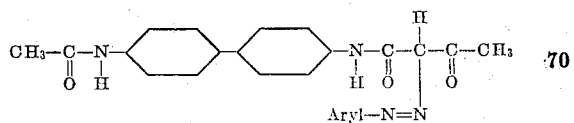

in which aryl is the radical of an arylamine compound.

5. A compound represented by the formula

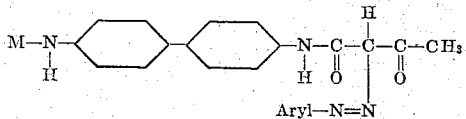

in which aryl is the radical of an arylamine compound and M is the radical of a hydrocarbon carboxylic acid devoid of groups which couple with diazo salts.

6. A compound represented by the formula

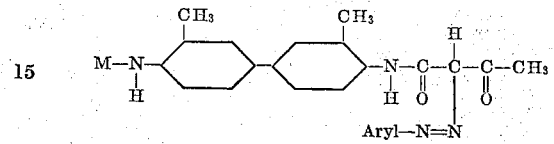

in which aryl is the radical of an arylamine compound devoid of solubilizing groups, M is the radical of a hydrocarbon carboxylic acid devoid of groups which couple with diazo salts.

7. A compound represented by the formula

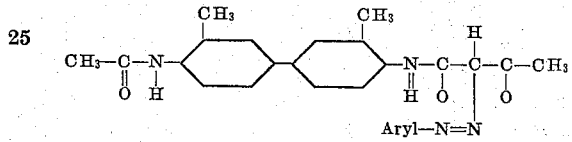

in which aryl is the radical of an arylamine compound.

8. A compound represented by the formula

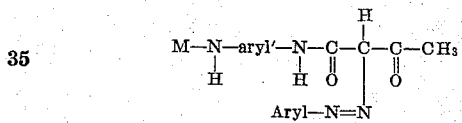

in which aryl is the radical of an arylamine devoid of solubilizing groups, M is the radical of a carbocyclic carboxylic acid, aryl' is the radical of a diphenyl compound.

9. A compound represented by the formula

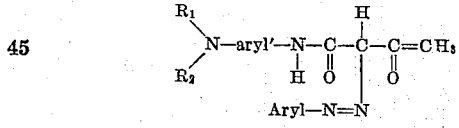

in which $R_1$ and $R_2$ represent nuclear carbons of a carbocyclic compound, aryl' is the nucleus of a diphenyl compound, and aryl is the radical of an arylamine devoid of solubilizing groups.

10. A compound represented by the formula:

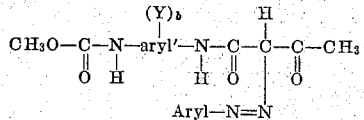

in which aryl' is the radical of a compound of the diphenyl series, Y is one of a group consisting of hydrogen and n-auxochrome, b is an integer at least four less than the number of carbons in aryl', and aryl is the radical of an arylamine which is devoid of solubilizing groups.

11. A compound represented by the formula:

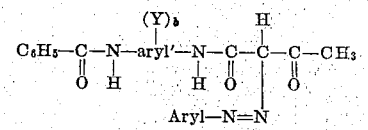

in which aryl' is the radical of a compound of the diphenyl series, Y is one of a group consisting of hydrogen and n-auxochrome, b is an integer at least four less than the number of carbons in aryl', and aryl is the radical of an arylamine which is devoid of solubilizing groups.

12. A compound represented by the formula:

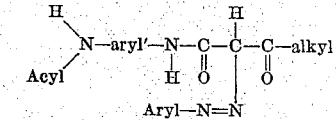

in which aryl is the radical of an arylamine devoid of solubilizing groups and aryl' is the radical of a diphenyl compound.

13. The compound represented by the formula:

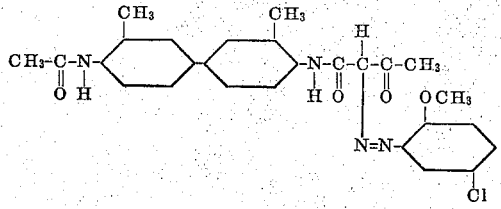

MILES AUGUSTINUS DAHLEN.
NEWELL MEADE BIGELOW.
FRITHJOF ZWILGMEYER.